(12) United States Patent
Langer

(10) Patent No.: US 8,776,428 B2
(45) Date of Patent: Jul. 15, 2014

(54) FISHING LURE ASSEMBLY

(75) Inventor: Alexander G. Langer, Framingham, MA (US)

(73) Assignee: Langer Technologies, Inc., Framingham, MA (US)

( * ) Notice: Subject to any disclaimer, the term of this patent is extended or adjusted under 35 U.S.C. 154(b) by 164 days.

(21) Appl. No.: 13/561,845

(22) Filed: Jul. 30, 2012

(65) Prior Publication Data

US 2013/0185989 A1  Jul. 25, 2013

Related U.S. Application Data

(63) Continuation-in-part of application No. 13/017,756, filed on Jan. 31, 2011, now Pat. No. 8,230,639, which is a continuation-in-part of application No. 11/472,821, filed on Jun. 22, 2006, now Pat. No. 7,895,789.

(60) Provisional application No. 60/692,923, filed on Jun. 22, 2005.

(51) Int. Cl.
*A01K 85/00* (2006.01)

(52) U.S. Cl.
USPC ....... 43/42.12; 43/42.15; 43/42.16; 43/42.28; 43/42.24

(58) Field of Classification Search
USPC ............ 43/42.12, 42.15, 42.16, 42.28, 42.24, 43/42.11
See application file for complete search history.

(56) References Cited

U.S. PATENT DOCUMENTS

| RE17,955 E | 2/1931 | Arbogast |
| 1,871,387 A | 8/1932 | Pflueger |
| 2,435,993 A * | 2/1948 | Zink ........................... 43/42.16 |
| 2,494,407 A | 1/1950 | Rhodes |
| 2,504,229 A | 4/1950 | Sinclair |
| 2,545,398 A | 3/1951 | Warobiew |
| 2,555,802 A | 6/1951 | Martin |
| 2,821,044 A | 1/1958 | Bateman |
| 2,835,999 A * | 5/1958 | Gillian ........................... 43/26.2 |

(Continued)

FOREIGN PATENT DOCUMENTS

| DE | 19936914 A1 | 12/2000 |
| FR | 2684844 A1 | 6/1993 |
| WO | WO 9419936 A1 | 9/1994 |
| WO | WO 9730584 | 8/1997 |

*Primary Examiner* — Christopher P Ellis

(74) *Attorney, Agent, or Firm* — Preti Flaherty Beliveau & Pachios LLP

(57) ABSTRACT

A pliable fishing lure assembly includes a lure body including a leading portion and a trailing portion joined by a connecting hinge portion. A pliable, spinnable appendage is connected for unrestrained 360° rotation to the lure body by a swivel mechanism. The lure body can bend or fold into a U-shaped form at the hinge portion. A hook through the leading portion includes a protruding barbed end on one side of the leading portion and a protruding eye on the opposite side of the leading portion. The lure assembly is formed from a neutrally buoyant or close to neutrally buoyant material. During a glide, the lure body can straighten out at the hinge portion, and the pliable, neutrally buoyant spinnable appendage does not interfere with the weighting and buoyancy of the lure body and does not add excessive drag in the water to the assembly. During retrieve, the lure body folds or bends at the hinge portion, and the barbed end of the hook is adjacent the trailing portion of the lure body, where it is at least partially protected from tangling in weeds and hidden from view.

14 Claims, 4 Drawing Sheets

(56) References Cited

U.S. PATENT DOCUMENTS

| | | | |
|---|---|---|---|
| 3,017,716 A * | 1/1962 | Hawks | 43/42.16 |
| 3,172,227 A | 3/1965 | Mackey | |
| 3,624,950 A | 12/1971 | Merckes | |
| 3,905,149 A | 9/1975 | McCloud | |
| 3,958,358 A | 5/1976 | Firmin | |
| 3,965,606 A * | 6/1976 | Bingler | 43/42.16 |
| 4,133,135 A | 1/1979 | Miles | |
| 4,257,183 A | 3/1981 | Arms | |
| 4,530,179 A | 7/1985 | Larew | |
| 4,777,758 A | 10/1988 | Phillips | |
| 4,831,767 A | 5/1989 | Pearce | |
| 4,845,883 A | 7/1989 | Langer | |
| 4,850,132 A | 7/1989 | Motyka | |
| 4,873,782 A | 10/1989 | Gudermuth, Jr. | |
| 5,042,189 A | 8/1991 | Bailey | |
| 5,070,639 A | 12/1991 | Pippert | |
| 5,121,567 A | 6/1992 | Boone | |
| 5,353,540 A | 10/1994 | Ward | |
| 5,522,170 A | 6/1996 | Cole | |
| 5,628,139 A * | 5/1997 | Rhoten | 43/42.15 |
| 5,630,289 A | 5/1997 | Dotson | |
| 5,647,163 A | 7/1997 | Gorney | |
| 5,930,941 A | 8/1999 | Hayes, II et al. | |
| 6,131,328 A | 10/2000 | Menne | |
| 6,141,900 A | 11/2000 | Rudolph | |
| 6,182,390 B1 | 2/2001 | Watkins | |
| 6,240,672 B1 | 6/2001 | Huppert | |
| 6,301,823 B1 | 10/2001 | Monticello et al. | |
| 6,481,914 B1 | 11/2002 | Grenier et al. | |
| 6,516,553 B1 | 2/2003 | King | |
| 6,536,155 B1 | 3/2003 | Van Risseghem | |
| 6,601,336 B1 | 8/2003 | Link | |
| 6,637,147 B2 | 10/2003 | Ooten | |
| 6,748,692 B2 | 6/2004 | Sprouse | |
| 6,857,220 B2 | 2/2005 | King | |
| 7,010,881 B2 | 3/2006 | Altman | |
| 7,080,476 B2 | 7/2006 | King | |
| 7,384,209 B2 | 6/2008 | Muders et al. | |
| 7,493,724 B1 | 2/2009 | Peterson | |
| 7,874,094 B2 * | 1/2011 | Brevig | 43/42.2 |
| 2002/0194770 A1 | 12/2002 | King | |
| 2008/0115402 A1 | 5/2008 | Helmin | |
| 2008/0202015 A1 | 8/2008 | Langer | |
| 2009/0090039 A1 | 4/2009 | Ross | |

* cited by examiner

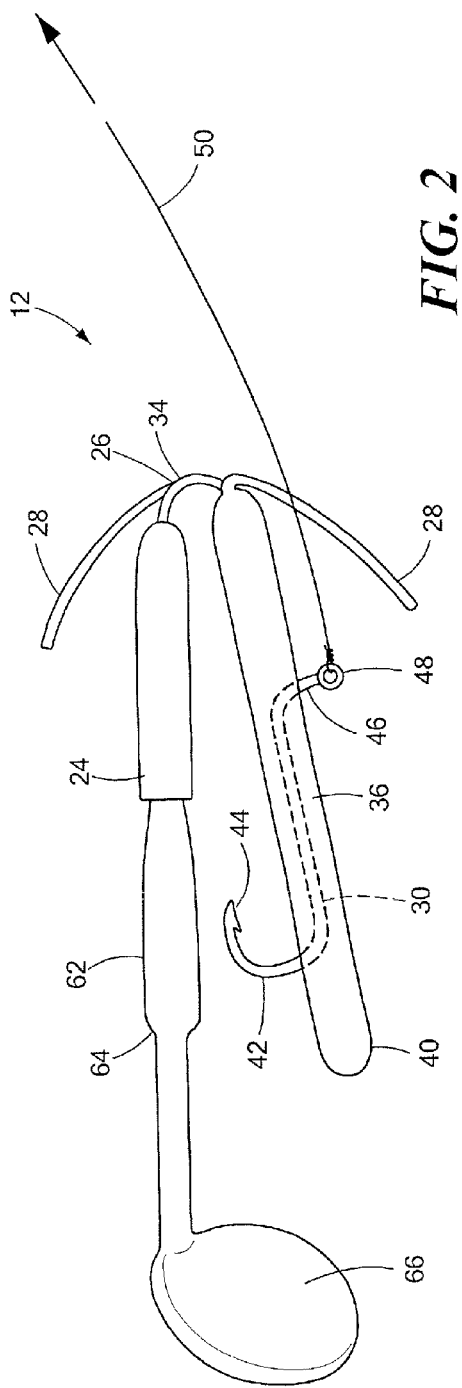
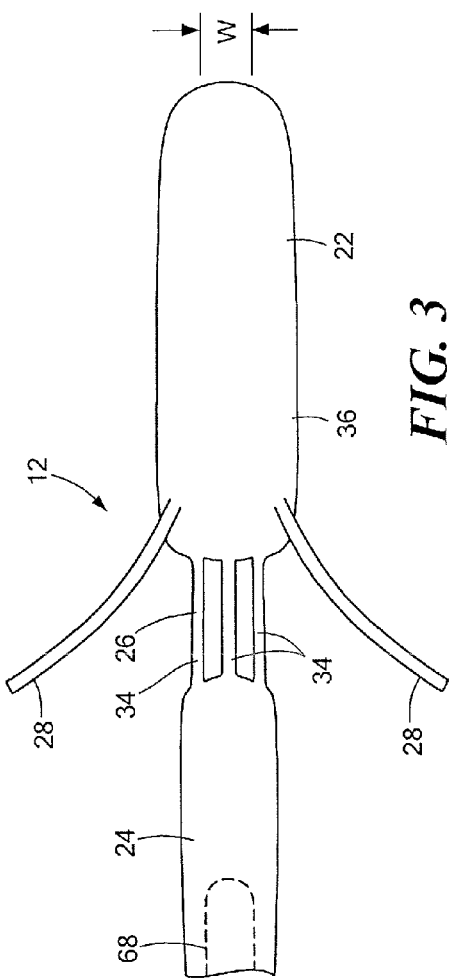
FIG. 2
FIG. 3

FISHING LURE ASSEMBLY

CROSS REFERENCE TO RELATED APPLICATIONS

This application is a continuation-in-part of U.S. patent application Ser. No. 13/017,756, filed on Jan. 31, 2011, which is a continuation-in-part of U.S. Pat. No. 7,895,789, issued Mar. 1, 2011, which claims the benefit of U.S. Provisional Patent Application No. 60/692,923, filed Jun. 22, 2005. This application claims the benefit under 35 U.S.C. §120 of U.S. patent application Ser. No. 13/017,756, filed on Jan. 31, 2011, and U.S. Pat. No. 7,895,789, issued Mar. 1, 2011, and U.S. Provisional Patent Application No. 60/692,923, filed Jun. 22, 2005, the disclosures of which are incorporated by reference herein.

STATEMENT REGARDING FEDERALLY SPONSORED RESEARCH OR DEVELOPMENT

N/A

BACKGROUND OF THE INVENTION

In fishing, spinners and spinning lures are used to attract fish. Conventional spinning blades made of metal are generally used in continuously-retrieved, relatively fast-moving lures such as in-line (Mepps-type) spinners, spinnerbaits, and the like. They are seldom used on slower-moving or bottom bouncing lures such as Skirted "Flipping" Jigs, Texas-rigged plastic worms, tube lures (unless these soft lures are rigged as a trailer to a spinner or buzzer, intended to be more or less continuously retrieved) for several reasons. Conventional metal blades need constant forward reeling motion or a free-fall weighted by a lure much heavier than the metal blade, to spin freely, because they are generally much heavier than water. They require the bait to move forward relatively quickly. Therefore they do not work well with slow-moving baits or lures that start and stop frequently.

Also, conventional metal blades are hard and rotate quickly. These blades are generally located in front of or away from the hook point, even when they adorn a soft swimming lure (such as the tiny propellers ahead of a pre-rigged swimming plastic worm). Otherwise, fish would be struck on the nose or mouth as they bite them and reject the bait, as often happens with spinnerbaits.

A number of pliable lures that spin are known. In one example, surgical tubing is trolled with a lead line on a swivel or behind a weight. In another example, a "balled up" plastic worm is rigged in such a manner as to put a bend in the worm by threading the plastic worm partially up the bend of a hook. These worm rigs spin in the water and are usually trolled or cast with a swivel connecting the lure to the fishing line.

These spinning lures are disadvantageous in that the entire lure spins. This can lead to line twist, because there is no portion of the lure attached to the line that does not spin. The "non-spinning" portion of the fishing rig is not the lure itself, but a sinker or swivel of some sort, which is often not enough to stop the line from twisting. Also, spinning lures can easily foul in weeds, because the leading portion of the lure instantly picks up weeds and spins them around its axis.

Various pliable spinning appendages for attachment to a fishing lure are disclosed in U.S. Pat. No. 7,895,789. The lure is attachable to a fishing line with no spinning with respect to the fishing line. The appendage is attached to the lure with a swivel mechanism that allows unrestricted 360° rotation. The appendages increase attractiveness, flash, vibration, color, or scent. Due to their slow spinning speed and neutral buoyancy in water, the appendages provide advantages when used with slow-moving lures not possible with hard blades.

SUMMARY OF THE INVENTION

A pliable fishing lure assembly is provided that has a realistic hydrodynamic gliding ability upon immersion in the water. The lure assembly comprises a lure body including a leading portion and a trailing portion joined by a connecting hinge portion and a soft appendage attached for unrestrained 360° rotation to the lure body. The lure assembly is formed from a pliable, soft, or non-rigid material that can be weighted for neutral or near neutral buoyancy and shaped to achieve a gliding motion through the water.

During a glide, the lure body can straighten out at the hinge portion. The pliable, neutrally buoyant spinnable appendage does not interfere with the weighting and buoyancy of the lure body and does not add excessive drag in the water to the assembly. Thus, the lure assembly is unobstructed by a heavy spinner or hardware or other sources of drag in the water. When the lure assembly is pulled through the water on retrieve, the lure body folds or bends at the hinge portion, which partially protects the barbed end of a hook embedded within the leading portion of the lure body. On retrieve, the spinning appendage spins more rapidly to provide flash and action to attract the fish.

DESCRIPTION OF THE DRAWINGS

The invention will be more fully understood from the following detailed description taken in conjunction with the accompanying drawings in which:

FIG. 2 is a side view of the lure assembly of FIG. 1 pulled by a fishing line;

FIG. 3 is a side view of the lure body of the lure assembly of FIG. 1;

DETAILED DESCRIPTION OF THE INVENTION

Figure 1:
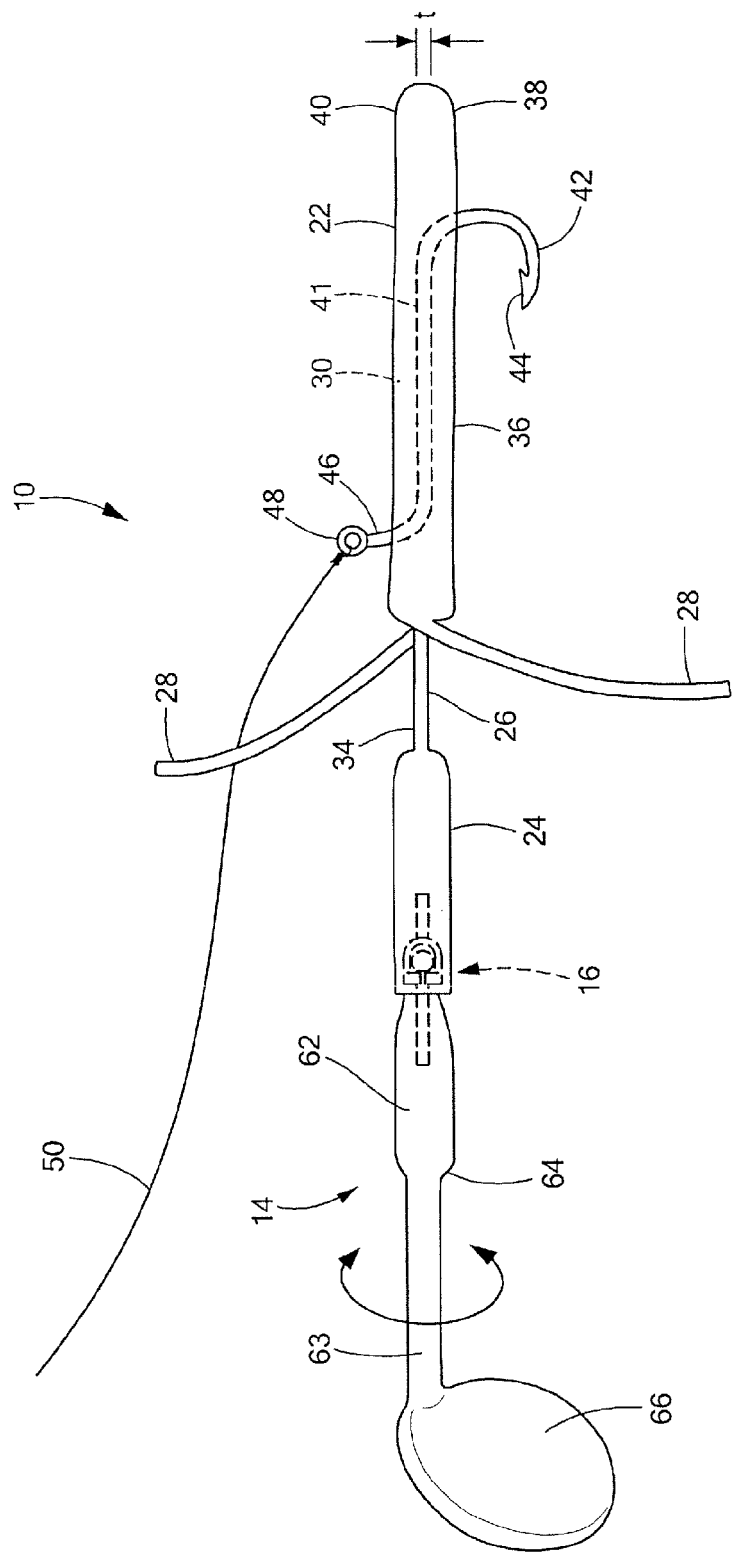
FIG. 1 is a side view of a lure assembly according to the present invention.

In one embodiment, illustrated in FIGS. 1-3, a fishing lure assembly 10 includes a pliable lure body 12 and a pliable spinning appendage 14 attached to the lure body with a swivel mechanism 16, preferably for 360° unrestricted rotation. The lure body includes a leading portion 22 and a trailing portion 24 joined by a connecting hinge portion 26. A hook 30 is embedded within the leading portion of the lure body.

The leading portion 22 and the trailing portion 24 can be weighted and shaped to glide hydrodynamically through the water. For example, the leading portion and trailing portion can be generally elongated and flattened in shape and are preferably formed of a neutrally or near neutrally buoyant material. The lure body can also be shaped to simulate a variety of underwater creatures. Appendages 28 can extend from one or both of the leading and trailing portions to simulate legs, fins, claws, or other parts of underwater creatures and to generate motion to attract fish. In the embodiment illustrated, two narrow appendages are illustrated extending from a rear 32 of the leading portion 22, although a variety of shapes and sizes can be provided, as will be appreciated by those of skill in the art. Other hydrodynamic shapes can be employed.

The hinge portion 26 is formed from one or more narrow connecting strips 34 extending between the leading portion 22 and the trailing portion 24. The hinge portion is formed from a pliable material that allows the hinge to fold or bend. Three connecting strips are illustrated, although one or any other number could be provided. The hinge portion is sufficiently narrower than the leading portion and the trailing portion in at least one dimension to allow the lure body to bend or fold at the hinge portion with no or minimal twisting of the hinge portion. In the embodiment illustrated, the hinge portion is narrower than the leading and trailing portions in both a thickness dimension t (FIG. 1) and a width dimension w (FIG. 3). When folded, the lure body assumes a U-shaped or curled form in which the leading portion 22 lies more closely adjacent to the trailing portion 24. The leading portion, trailing portion, and hinge portion are preferably integrally formed as a single piece from the same material.

The hook 30 includes a midsection 41, generally straight, that extends through a midsection 36 of the leading portion 22. The hook includes a curved front section 42 that protrudes from the leading portion on one side 38. The curved section terminates with a barbed end 44 that is exposed outside of the body. The hook includes a curved rear section 46 that protrudes from the leading portion near the rear 32 on an opposite side 40 of the body. The rear curved section 46 terminates with an eye 48 for non-spinning attachment to a fishing line 50 controlled by a fisherman. A narrow diameter channel can be formed through the leading portion if desired to ease insertion and removal of the hook.

When the fishing line 50 is taut, it exerts a force on the lure assembly. The hinge portion bends and the lure assembly assumes the U-shaped or curled form, as illustrated generally in FIG. 2, as the lure assembly is pulled through the water on retrieve. The barbed end of the hook is adjacent to the trailing portion of the lure body, where it is at least partially protected between the leading portion and the trailing portion, minimizing the opportunity for tangling or fouling in weeds. In this location, the barbed end is also at least partially hidden from view. The appendages wave in the flow of the water currents, and the spinning appendage spins, attracting fish by their movement. When the fishing line is slack, the lure assembly can glide or drift through the water, and the lure body can assume a straightened shape, as illustrated in FIG. 1. The appendages wave as directed by the water currents flowing past the lure assembly and the spinning appendage can spin relatively more slowly.

The gliding ability of the lure assembly permits the lure to sink slowly in a controllable direction away from the fisherman. During a glide the lure assembly simulates a moving living creature more realistically than a sinking lure. During retrieval, however, the lure assembly can act like a conventional sinking lure to simulate a fast-swimming creature moving through the water. The lure glides during descent in the water on a shallow path and ascends on a steep path during retrieval. Thus, the lure can be advanced without re-casting. The lure rises quickly to the surface upon a strong pull on the fishing line and then advances away form the fisherman upon a glide to a spot at a greater distance from the fisherman. Because the lure assembly can move away from the fisherman, it can reach places that a sinking lure cannot reach such as under overhanging tress, undercut banks, docks, moored boats and submerged objects. This action is useful for advancing the lure into areas inaccessible by conventional casting.

The spinning appendage does not obstruct these actions of the lure body in the water, and in particular does not interfere with the forward glide of the lure assembly. Because the spinning appendage is also formed from a pliable, neutrally or near neutrally buoyant material, it does not interfere with the weighting of the lure body either by the appendage's own weight or by generating excessive drag in the water. In contrast, prior art spinning appendages having metal blades add excessive weight and drag that do interfere with the forward glide of a fishing lure.

The appendage 14 can take on a variety of configurations. In one embodiment, illustrated in FIGS. 1 and 2, the pliable appendage is made from a plastic material formed as a unitary body shaped with a section 62 serially joined by a narrow portion 64 to a section 63 with a blade 66 formed at the end. More than one section 62 separated by narrow portions 64 can be provided if desired. The appendage can be separated at a narrow portion 4 to shorten the length of the appendage if desired. The narrow portion can be severed with a tool (for example, a knife or scissors), or if the material permits, can be simply pulled apart. The tip of the appendage is similarly narrowed to fit readily behind or within a shroud 68 formed on the end of the trailing portion of the lure body, thereby deflecting, not trapping, weeds. When the lure assembly is pulled through weeds, the shroud and narrow portion allow weeds to slide off as the lure assembly moves by. In another embodiment, shown in FIG. 4, the appendage 14' may include a thin elongated portion 72 of a flexible material and a blade 74 formed at the end thereof. The flexible elongated portion makes the appendage more susceptible to changes in the direction of water flow, and assists in positioning the appendage in alignment with the prevailing water flow, allowing for maximal spinning of the appendage. The flexible elongated portion also adds a more exaggerated wiggling motion to the tail of the lure assembly when combined with the spinning of the appendage.

The pliable material from which the lure body and the appendage are formed should also be soft and/or thin enough to be compressible and deformable by the jaws of a fish or between two fingers of an average human hand. The pliable, compressible properties of the appendage allow it to flex and deflect weeds, and not to become fouled by the weeds, as can happen with hard spinners. Suitable materials may include a plastisol, such as vinyl plastisol, cyberflex, or a pliable foam. Other materials can be used, such as a suitably shaped soft pork rind, fabric, a synthetic material such as TYVEK®, or any other material suitably pliable, compressible and deformable. Neutrally buoyant or near neutrally buoyant materials, with a specific gravity about the same as water, are desirable so that the fishing lure assembly can come at least close to neutral buoyancy in the water and achieve a realistic gliding motion. The forward glide of the lure is unimpeded by the soft plastic spinning tail as it glides with a minimum amount of resistance through the water. Because the spinning tail is about the same specific gravity as the water, it does not have a sufficient amount of drag to slow or stop the lure's forward glide. The fact that the blade is not metal keeps the lure properly weighted towards the front and does not interfere with the proper glide angle.

A variety of swivel mechanisms can be employed to attach the pliable appendage to the lure body. Preferably, the swivel mechanism spins freely to allow unrestricted 360° rotation of the appendage and is loose enough to quickly point the spinning appendage into the flow of the water. The swivel mechanism can be formed of any suitable material, such as a plastic or metal material. Plastic is a suitable material to prevent the formation of rust.

Figure 4:
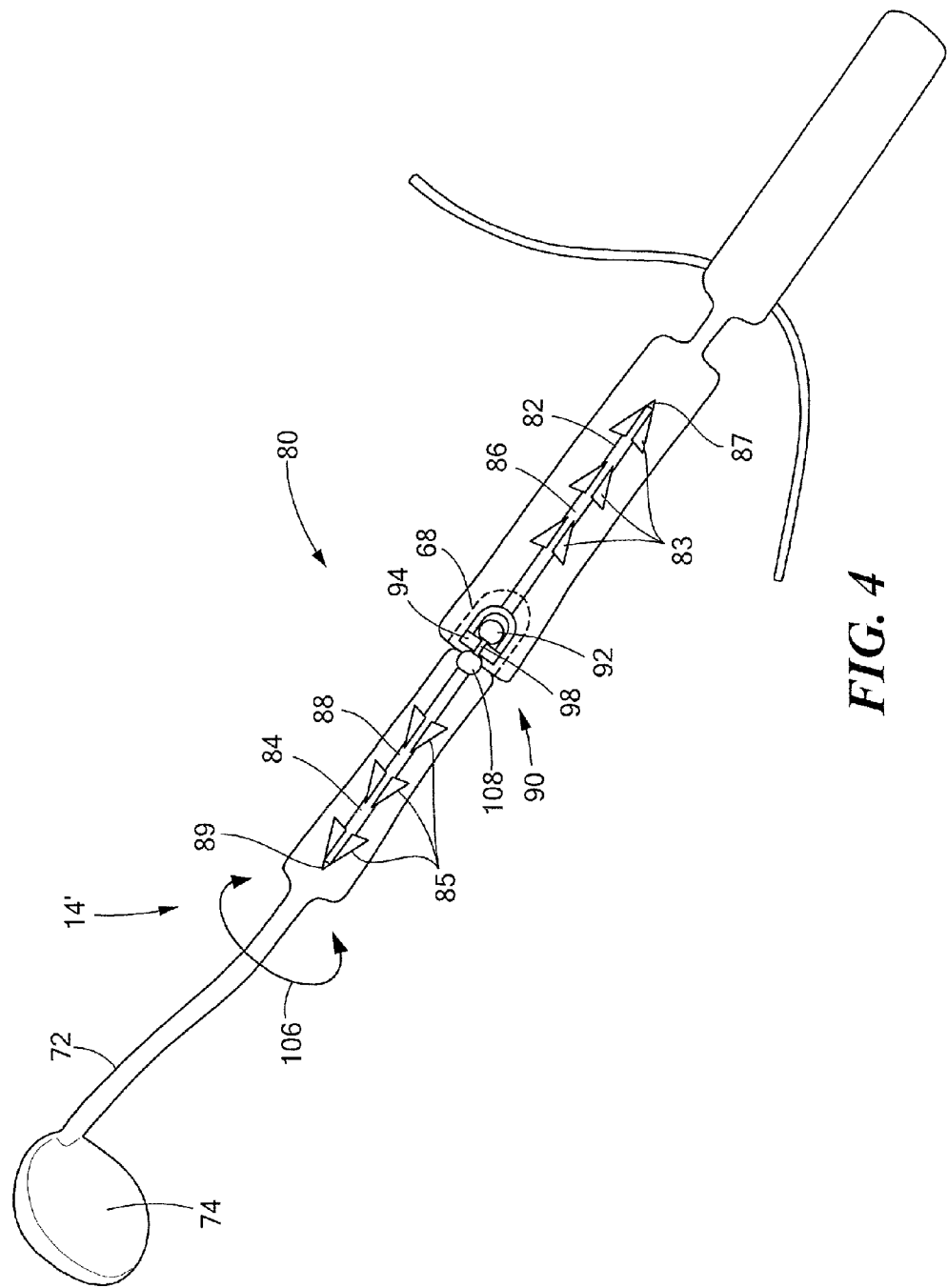
FIG. 4 is a side view of a further embodiment of a lure assembly also illustrating a swivel mechanism.
Figure 5:
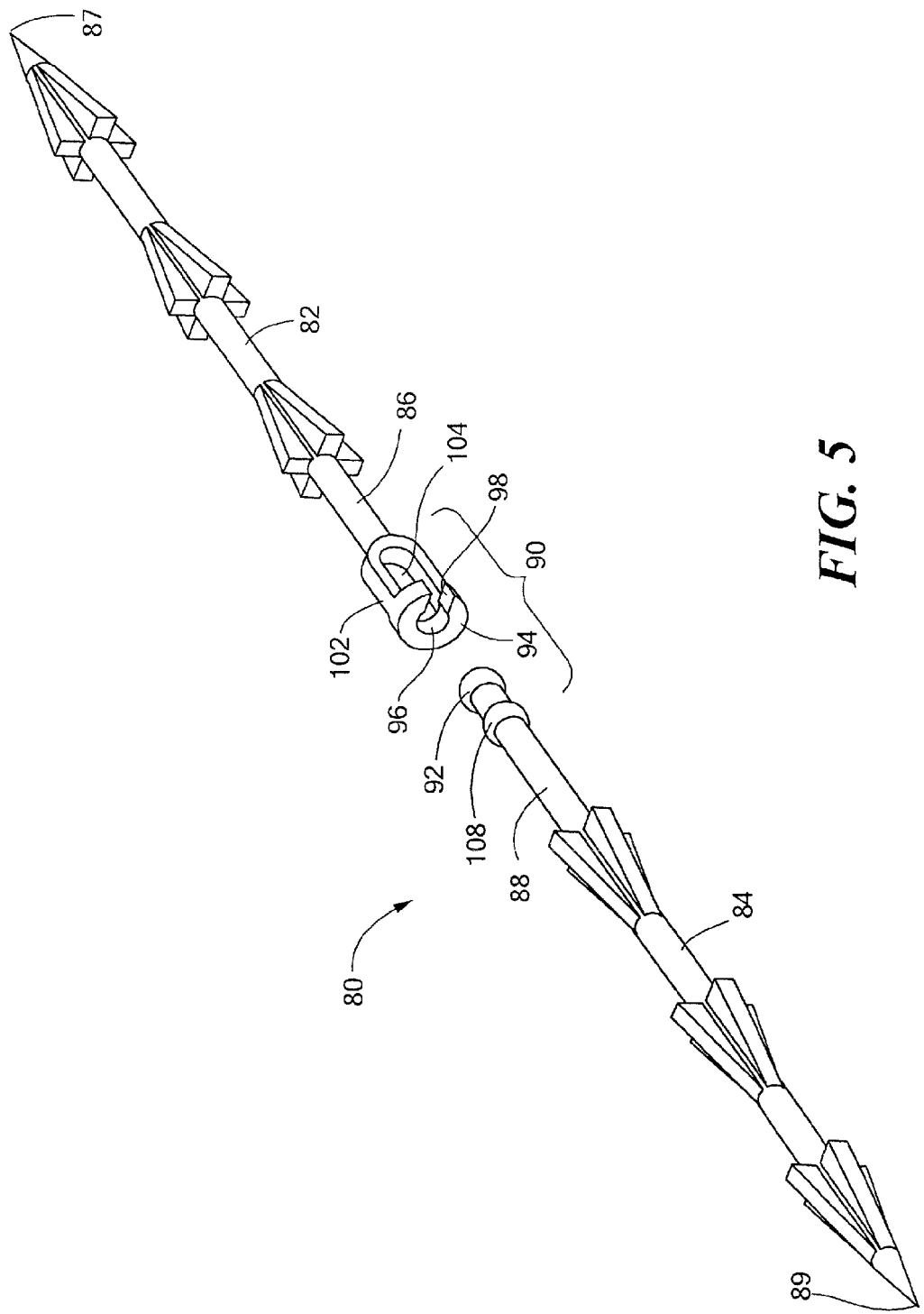
FIG. 5 is an exploded view of the swivel mechanism of FIG. 4.

One embodiment of a suitable swivel mechanism 80 is illustrated in FIGS. 4 and 5. This swivel mechanism is also described in U.S. patent application Ser. No. 13/017,756, the disclosure of which is incorporated herein by reference. The swivel mechanism comprises two sections, a leading section 82 and a trailing section 84. The leading section is attachable to the trailing portion 24 of the lure body 12, and the trailing section is attachable to the appendage 14, 14'. A swivel connection 90 allows the two sections 82, 84 to spin an unrestricted 360° with respect to each other about an axis defined by shafts 86, 88 of the two sections. The leading and trailing sections can also be readily connected and disconnected from each other via the swivel connection 90.

More particularly, both the leading section 82 and the trailing section 84 each includes a pointed tip 87, 89 on the shafts 86, 88 that allows the shaft of each section to be inserted into the material of the lure body 12 or the appendage 14, 14'. A number of barbed elements 83, 85 are formed along each shaft 86, 88. The shoulders on the barbed elements retain the section within the material of the lure body or the appendage.

The swivel connection 90 includes an enlarged end bead or ball 92 formed on the end of the shaft 88 of the trailing section 84. The swivel connection also includes an annular split ring or washer 94 formed on the end of the shaft 86 of the leading section 82. The split ring has a central aperture 96 therethrough and a side split 98. The ring 94 is attached to the end of the shaft 86 via arms 102, forming a generally bell-shaped enclosure 104 for the end bead 92 on the trailing section 84. The width of the split 98 in the ring is sufficient to allow the shaft 88 of the trailing section 84 to pass through the split 98 with a snapping action due to a slight flexing apart of the ring 94. Once the shaft has passed through the split, the shaft is retained in the central aperture 96, and the end bead 92 of the trailing section is enclosed within the enclosure 104 formed by the ring 92 and the arms 102. The shaft 88 of the trailing section 84 is able to rotate freely an unrestricted 360° about its axis with respect to the shaft 86 of the leading section 82, as indicated by arrow 106. The weed shroud 68 of the lure body 12 also covers the enclosure 104 to prevent weeds from entangling in the swivel connection 90.

Optionally, another enlarged bead or ball 108 is formed along the shaft 88 spaced a small distance from the end bead 92. This distance is substantially equal to the thickness dimension of the split ring 94, to restrain the trailing section 84 from axial displacement in the direction of the shaft axis, which also aids in locking the trailing section 84 to the leading section 82 during use while fishing. In particular, this feature prevents the swivel connection from separating during a cast.

The trailing section 84 can be readily separated from the leading section 82 by pulling the shaft 88 through the split 98. A slight angular motion or torque may be applied to the shaft to assist in the operations of inserting or removing the trailing section. Because the leading and trailing sections can be readily assembled and disassembled, any combination of lure and appendage can be formed, as desired, simply by swapping out an appendage or a lure for a different one.

The pliable lure body and spinning appendage of the present invention are useful for a number of reasons. In use, the lure body attached to the fishing line does not spin, while the appendage on the trailing section is able to spin freely in 360°, providing a great deal of attractive action, flash, and vibration while fishing. Soft appendages used as a trailer behind a lure or hook are advantageous, because fish will bite them and hang on, just as they bite a plastic worm and hold on until the angler can set the hook. Soft lure assemblies are generally neutrally buoyant (meaning little or no positive or negative in-water buoyancy) in the water, and not substantially heavier than water, as with like conventional metal parts. The soft appendages start spinning more easily and spin at slower speeds than a similar hard spinner blade which needs to overcome its own in-water weight and inertia. The lure body and the appendage of the present lure assembly naturally adapt to a slow start/stop retrieve as well as a first retrieve, giving them greater versatility than lures employed with conventional hard blades. A neutrally buoyant spinning appendage can spin at extremely slow speeds, such as during the freefall of a slowly sinking lure body simulating a worm weighted only by a hook. This type of slow speed motion has not been possible with a hard spinning blade. The lure assembly creates significant motion that even a "curly tail" soft plastic lure cannot emulate. Curly tail lures must fall or be retrieved at a faster speed to make the tail wiggle.

The soft or pliable lure assemblies give slow moving lures such as worms much more action, flash and vibration than presently available. For example, a rotating tail gives much more motion, eccentricity and vibration when compared to present curly-tail worms or minnow-type wiggling tails. A spinning tail continuously rotates 360° on retrieve or on the drop, flutters when stopped and moves completely freely, yielding a new type of action. Currently available tails and appendages cannot continuously traverse a 360° arc, but merely flap back and forth generally no more than 180°. When retrieved, a soft appendage shakes a worm or jig due to the spinning inertia of the rotating mass of the appendage, giving additional uncommon action. Such violent motion can activate rattles placed in the appendage or the lure body during the retrieve, which is currently difficult, if not impossible with conventional soft plastic tails.

The forward, non-spinning lure body of the lure assembly can deflect weeds and obstructions. By not spinning, the forward portion of the lure assembly does not accumulate weeds, but rather slides over weeds and acts as an "ice breaker." When the spinning appendage follows along behind the forward portion of the lure assembly, the weeds have already been mostly spread or deflected, allowing the aft appendage to continue spinning freely.

A non-spinning forward lure body allows the hook to stay in the optimal place for hooking a fish rather than spin 360° every few seconds. Although it is possible to hook a fish on a spinning hook, it is not optimal. The hook should remain as upright as possible for optimum hooking potential at all times, which is possible with the present lure assembly.

For many lure presentations, the angler does not want the lure to spin in its entirety, just those appendages that give it lifelike action. This is especially true with the ultra-slow presentations that can be achieved with soft, zero-buoyancy blades. For example, a soft plastic crawfish imitation should not spin on its axis unnaturally. The claws or appendages, however, should have motion, while the body remains stationary and looks natural under water.

Soft appendages can be impregnated with salt or other scents. In addition, the rotating motion disperses the scents much more quickly than a lure body of a soft plastic lure moving through the water. The appendage disperses the scent centrifugally and presses the scent out of the plastic. The appendage also traverses much more water than the linear retrieve distance of a lure because it spins. With each rotation of the appendage, it traverses much more water than the distance it is retrieved, therefore increasing the water flow past the scent-impregnated plastic, increasing the dispersion gradient.

The invention is not to be limited by what has been particularly shown and described, except as indicated by the appended claims.

What is claimed is:

1. A fishing lure assembly comprising:
    a lure body formed from a pliable material, the lure body comprising a leading portion, a trailing portion, and a connecting hinge portion, the connecting hinge portion comprising at least one strip connecting the leading portion and the trailing portion, the strip narrower in at least one dimension than the leading portion and the trailing portion so that the lure body can bend at the hinge portion into a U-shaped form;
    a spinnable appendage formed from a pliable material; and
    a swivel mechanism spinnably attaching the spinnable appendage to the trailing portion of the lure body.

2. The fishing lure assembly of claim 1, further comprising a hook comprising:
    a midsection extending through a midsection of the leading portion of the lure body;
    a curved front section terminating with a barbed end protruding from a first side of the leading portion; and
    a curved rear section terminating with an eye for non-spinning attachment to a fishing line protruding from an opposite side of the leading portion, the curved rear section spaced more closely to the connecting portion than the curved front section is spaced from the connecting hinge portion.

3. The fishing lure assembly of claim 1, wherein the leading portion and the trailing portion of the lure body are generally elongated and flattened in shape.

4. The fishing lure assembly of claim 1, wherein the lure body is shaped and weighted to be capable of hydrodynamically gliding in water away from a fisherman.

5. The fishing lure assembly of claim 1, further comprising one or more fixed appendages extending from the leading portion of the lure body.

6. The fishing lure assembly of claim 1, wherein the swivel mechanism includes a swivel connection providing unrestricted 360° rotation of the spinnable appendage with respect to the lure body.

7. The fishing lure assembly of claim 1, wherein the swivel mechanism comprises:
    a leading section attachable to the lure body comprising a shaft insertable into the trailing section of the lure body, the shaft including a pointed tip and barbed elements disposed along the shaft,
    a trailing section attachable to the spinnable appendage comprising a shaft insertable into the spinnable appendage, the shaft including a pointed tip and barbed elements disposed along the shaft, and
    a swivel connection removably connecting the leading section and the trailing section, the swivel mechanism providing unrestricted 360° rotation of the spinnable appendage with respect to the fishing lure.

8. The fishing lure assembly of claim 1, wherein the spinnable appendage is comprised of a plastisol, cyberflex, foam, or pork rind.

9. The fishing lure assembly of claim 1, wherein the lure body is comprised of a plastisol, cyberflex, foam, or pork rind.

10. The fishing lure assembly of claim 1, wherein the lure body and the spinnable appendage are comprised of neutrally buoyant or near neutrally buoyant material.

11. The fishing lure assembly of claim 1, wherein the spinnable appendage includes a blade.

12. The fishing lure assembly of claim 1, wherein the lure body includes a shroud at an end of the trailing portion opposite the hinge portion, the swivel mechanism including a swivel connection disposed within the shroud to prevent weeds from entangling the swivel mechanism.

13. The fishing lure assembly of claim 1, wherein the spinnable appendage comprises a unitary body shaped with several sections serially joined by narrow portions, the narrow portions being separable to shorten the length of the spinnable pliable appendage.

14. The fishing lure assembly of claim 1, wherein the spinnable appendage includes a thin elongated portion of flexible material and a blade at the end of the elongated portion.

* * * * *